United States Patent
Pickens et al.

(10) Patent No.: US 8,291,776 B1
(45) Date of Patent: Oct. 23, 2012

(54) FORCE SENSOR USING CHANGES IN MAGNETIC FLUX

(75) Inventors: Herman L. Pickens, Gurley, AL (US); James A. Richard, Grant, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 255 days.

(21) Appl. No.: 12/827,515

(22) Filed: Jun. 30, 2010

(51) Int. Cl.
*G01L 1/12* (2006.01)

(52) U.S. Cl. ........................................ 73/862.69; 73/779

(58) Field of Classification Search ............. 73/779, 73/862.69
See application file for complete search history.

(56) References Cited

U.S. PATENT DOCUMENTS

| | | | |
|---|---|---|---|
| 5,184,037 A * | 2/1993 | Kobayashi et al. ............. 310/26 |
| 5,557,974 A | 9/1996 | Hase et al. |
| 5,602,434 A | 2/1997 | Riedl |
| 5,831,180 A | 11/1998 | Tanaka et al. |
| 5,850,109 A | 12/1998 | Mock et al. |
| 5,905,210 A * | 5/1999 | O'Boyle et al. .......... 73/862.331 |
| 5,982,054 A | 11/1999 | Rathore et al. |
| 6,189,391 B1 | 2/2001 | Wittenstein et al. |
| 6,237,428 B1 | 5/2001 | Odachi et al. |
| 6,246,132 B1 * | 6/2001 | Joshi et al. ....................... 310/26 |
| 6,294,849 B1 | 9/2001 | Teter |
| 6,439,066 B1 | 8/2002 | Norton |
| 6,622,577 B1 * | 9/2003 | Uras .......................... 73/862.69 |
| 6,912,922 B2 | 7/2005 | Cheshmehdoost et al. |
| 6,931,940 B2 | 8/2005 | Baudendistel |
| 6,988,414 B2 | 1/2006 | Ruhrig et al. |
| 7,234,361 B2 | 6/2007 | Lequesne et al. |
| 7,362,096 B2 | 4/2008 | Oberdier et al. |
| 2004/0187606 A1 | 9/2004 | Nehl et al. |
| 2005/0160835 A1 | 7/2005 | Masaki et al. |

FOREIGN PATENT DOCUMENTS

JP 2001174263 A 6/2001

* cited by examiner

*Primary Examiner* — Max Noori
(74) *Attorney, Agent, or Firm* — Peter J. Van Bergen; James J. McGroary

(57) ABSTRACT

A force sensor includes a magnetostrictive material and a magnetic field generator positioned in proximity thereto. A magnetic field is induced in and surrounding the magnetostrictive material such that lines of magnetic flux pass through the magnetostrictive material. A sensor positioned in the vicinity of the magnetostrictive material measures changes in one of flux angle and flux density when the magnetostrictive material experiences an applied force that is aligned with the lines of magnetic flux.

13 Claims, 2 Drawing Sheets

FORCE SENSOR USING CHANGES IN MAGNETIC FLUX

ORIGIN OF THE INVENTION

The invention described herein was made in the performance of work under a NASA contract and by an employee of the United States Government and is subject to the provisions of Public Law 96-517 (35 U.S.C §202) and may be manufactured and used by or for the Government for governmental purposes without the payment of any royalties thereon or therefore. In accordance with 35 U.S.C §202, the contractor elected not to retain title.

BACKGROUND OF THE INVENTION

1. Field of the Invention

This invention relates to sensors used to measure force. More specifically, the invention is a force sensor that relates a force applied to the sensor to a change in magnetic flux caused by the force.

2. Description of the Related Art

In many aerospace applications, cryogenic temperatures are encountered. Accordingly, systems operating in these environs must be able to tolerate the extreme temperatures. The reliability of these systems can be compromised by even the smallest components such as the sensors (e.g., force sensors) used to initiate various system operations.

SUMMARY OF THE INVENTION

Accordingly, it is an object of the present invention to provide a force sensor.

Another object of the present invention is to provide a force sensor that will operate reliably in cryogenic applications.

Other objects and advantages of the present invention will become more obvious hereinafter in the specification and drawings.

In accordance with the present invention, a force sensor includes a magnetostrictive material and a magnetic field generator positioned in proximity to the magnetostrictive material for the purpose of inducing a magnetic field in and surrounding the magnetostrictive material. As a result, lines of magnetic flux pass through the magnetostrictive material. A sensor is positioned in the vicinity of the magnetostrictive material for measuring changes in at least one of flux angle and flux density when the magnetostrictive material experiences an applied force that is aligned with the lines of magnetic flux.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
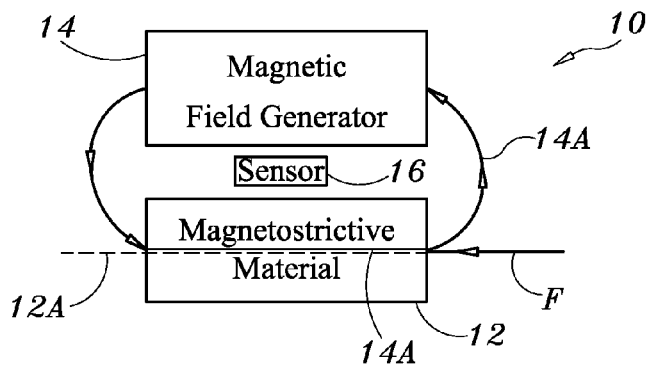
FIG. 1 is a top-level schematic view of a force sensor that uses change in flux in accordance with the present invention.

Referring now to the drawings and more particularly to FIG. 1, a force sensor that uses change in flux as the means to sense force changes in accordance with the present invention is shown and is referenced generally by numeral 10. It is to be understood force sensor 10 can be realized by a variety of embodiments thereof without departing from the scope of the present invention. In support of this assertion, several embodiments of force sensors constructed in accordance with the present invention will be described later herein.

At the heart of force sensor 10 is a magnetostrictive material 12 that undergoes change in permeability when a change in force is applied thereto along an axis thereof while material 12 is disposed in a magnetic field having flux lines that are substantially aligned with the axis. In the illustration, the changing force that is applied to magnetostrictive material 12 lies along dashed line 12A. Force sensor 10 also includes a magnetic field generator 14 capable of producing a magnetic field near material 12 such that an induced magnetic field in and around material 12 causes magnetic flux 14A to pass through material 12 in substantial alignment with direction 12A. In other words, magnetic field generator 14 provides a magnetizing force, H, that induces a magnetic field having a magnetic flux density, B, in material 12. Flux density B is equal to $\mu H$ where $\mu$ is the permeability of material 12. The magnitude and direction of the magnetic field inside and surrounding material 12 is dependent upon H, $\mu$, and the orientation of the magnetic domains within material 12. The permeability of material 12 and the orientation of its domains change when a force is applied to material 12.

Force sensor 10 also includes a magnetic flux sensor 16 positioned adjacent to magnetostrictive material 12 and in the magnetic field thereof. Magnetic flux sensor 16 is any sensor (s) capable of detecting magnetic flux density and/or magnetic flux angle in, for example, a planar dimension of interest. In the absence of any force being applied to material 12 along dimension 12A, the internal and external magnetic fields associated with material 12 will be static in both magnitude and direction. However, when a force, F, is applied along direction 12A, the magnetic domains of material rotate. Note that while force F is illustrated as a compressive force on material 12, it could also be an extensive or tensile force acting on material 12. In either case, rotation of the magnetic domains causes the internal and external magnetic fields to change in both magnitude and direction, thereby changing the magnetic flux density and flux angle. Accordingly, sensor 16 can be a flux density sensor for detecting flux density change proportioned to force F, or a magnetic angle sensor for detecting angular change in a flux line (vector) caused by force F where such angular change can be measured in a particular plane of reference or in three dimensions. In each case, force sensor 10 would be calibrated prior to use in order to equate known values of force F with corresponding changes in flux density or flux angle.

As mentioned above, the present invention can be realized by a variety of embodiments. For example, the magnetostrictive material could reside in a free-space environment. However, the sensor(s) required to detect flux changes in a freespace-based force sensor would necessarily have to be extremely sensitive since much of the generated magnetic field would be dispersed in free space. Accordingly, it may be desirable to construct embodiments of the present invention that concentrate the magnetic field in and around the magnetostrictive material. With this goal in mind, several illustrative and non-limiting embodiments of the present invention will be described with the aid of FIGS. 2-6.

Figure 2:
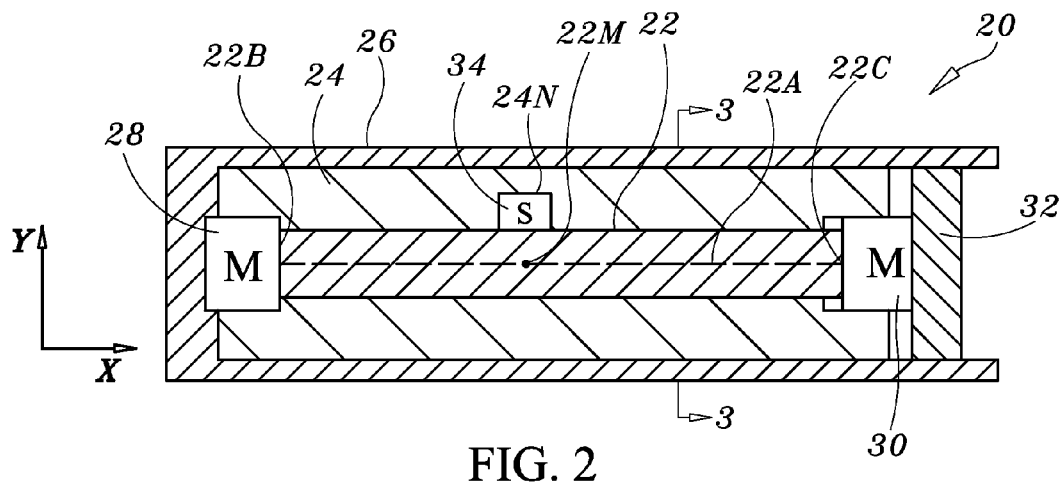
FIG. 2 is a cross-sectional view of a force sensor using two permanent magnets in accordance with an embodiment of the present invention.
Figure 3:
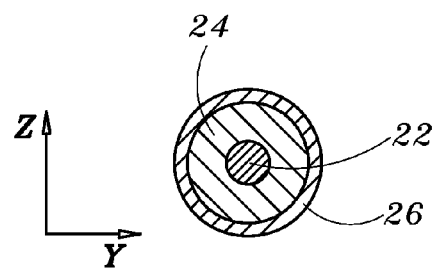
FIG. 3 is a cross-sectional view of the force sensor in FIG. 2 taken along line 3-3 thereof.

Referring first to FIGS. 2 and 3, a force sensor 20 uses a rod 22 of magnetostrictive material. Rod 22 is an elongated piece of magnetostrictive material whose radial cross-section could be any shape (e.g., circular as shown, triangular, rectangular, octagonal, etc.) without departing from the scope of the present invention. Regardless of its cross-sectional shape, rod 22 will have a longitudinal axis (referenced by dashed line 22A) with opposing longitudinal ends noted by numerals 22B and 22C. Rod 22 further has a center of mass indicated at numeral 22M. The particular choice of magnetostrictive material is not a limitation of the present invention. For aerospace applications where cryogenic temperatures are encountered, suitable magnetostrictive materials include, but are not limited to, terbium-based compounds such as Terfenol-D which is commercially available from Etrema Products, Inc., gallium-iron compounds such as Galfenol, and rare earth zinc crystal-based compounds such as Terzinol.

Rod 22 is encased within a guide 24 that supports and protects rod 22. Guide 24 is made from a non-magnetic or low magnetic permeability material, and is sized such that rod 22 slides within guide 24. The assembly of rod 22 and guide 24 is fitted within an open-ended housing 26 made from a magnetic material having high permeability and low hysteresis. That is, the purpose of housing 26 is to provide a low reluctance path for a magnetic field as will be explained further below. In the illustrated embodiment, guide 24 defines a cylindrical outer surface and housing 26 is an open-ended cylinder. However, it is to be understood that the outer surface of guide 24 and housing 26 could take other geometric shapes without departing from the scope of the present invention. Further, housing 26 could be a one-piece housing or a multiple-piece assembly thereof without departing from the scope of the present invention.

Positioned at opposing longitudinal ends 22B and 22C of rod 22 are permanent magnets ("M") 28 and 30, respectively. The purpose of magnets 28 and 30 is to provide a magnetizing force H that induces the magnetic field in and around rod 22 as will be explained below. In the illustrated embodiment, magnets 28 and 30 are retained by guide 24 with magnet 28 abutting the end of housing 26 and magnet 30 slidingly fitted in guide 24 for reasons that will be explained below.

A piston 32 is slidingly fit within housing and abuts magnet 30. Piston 32 is similar to housing 26 in terms of its material construction, i.e., magnetic material with high permeability and low hysteresis. Typically, piston 32 is made from the same material as housing 26.

A flux sensor ("S") 34 is positioned adjacent a surface of rod 22. For example, flux sensor 34 could be retained within a notch 24N formed in guide 24 adjacent to a radial surface of rod 22 at a location along rod 22 that is aligned with its center of mass 22M. This is a typical placement for flux sensor 34 when it is a magnetic flux angle sensor that is sensitive to flux angle changes in a two-dimensional plane such as the x-y plane, i.e., the plane formed with the x-direction along longitudinal axis 22A and the y-direction along a radius from axis 22A. Note that a different orientation of such a flux sensor 34 could make measurements in an x-z or y-z plane. When flux density is to be measured, a flux density sensor (not shown) is typically positioned adjacent to an axial end of rod 22. For clarity of illustration, electrical connections between sensor 34 and a data acquisition system (not shown) have been omitted. Such connections and data acquisition systems (or wireless versions thereof) are well understood in the art.

Figure 4:
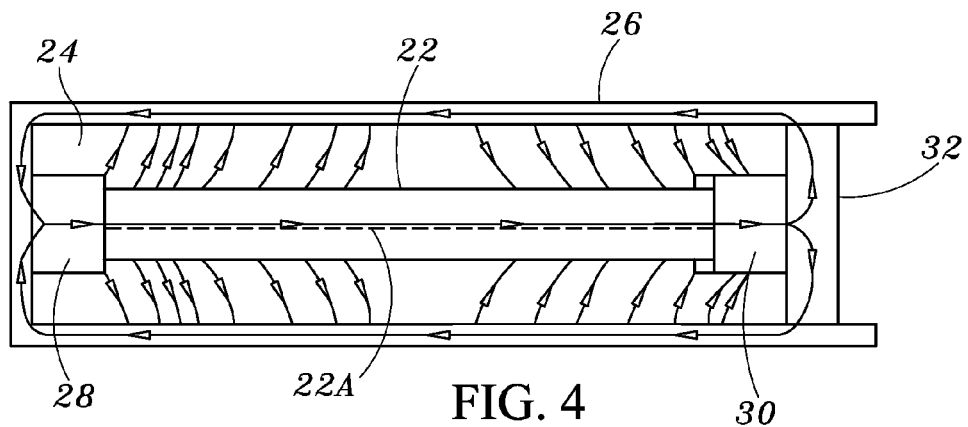
FIG. 4 illustrates the lines of magnetic flux present in the force sensor during a static state thereof.

The combination of housing 26, magnets 28/30, and piston 32 essentially form a magnetic field generator that induce and confine/concentrate a magnetic field/flux lines in and surrounding rod 22. The lines of magnetic flux are illustrated in FIG. 4 (where crosshatch lines are omitted for clarity) where the lines of magnetic flux in rod 22 are essentially aligned with its longitudinal axis 22A. As a result, a closed loop magnetic path is defined by the combination of housing 26, magnets 28/30, piston 32, and rod 22. The lines of magnetic flux illustrated in FIG. 4 are depicted for a static condition, i.e., no force being applied to piston 32.

When a force is applied to piston 32, at least a component of this force will act on piston 32 such that it slides in guide 24. For example, if the axial component of the force drives piston into housing 26, a compressive axial force is applied to rod 22 as piston 32 pushes magnet 30 axially against end 22C of rod 22. This causes the magnetic domains of rod 22 to rotate, thereby changing the angular orientation of the flux lines where such change (e.g., relative to the static condition) is sensed by flux sensor 34. Note that if the force sensor must be sensitive to an extensive or tensile force, piston 32, magnet 30 and end 22 of rod 22 must be coupled to one another.

Figure 5:
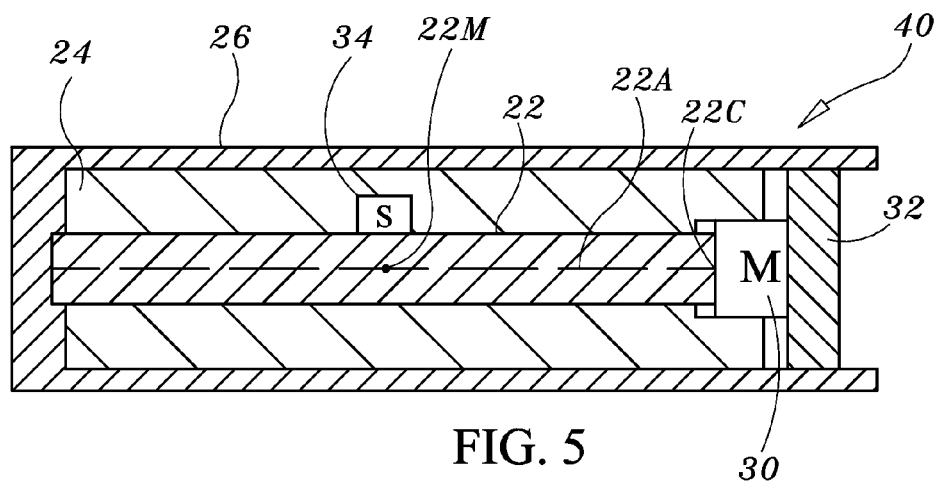
FIG. 5 is a cross-sectional view of a force sensor using one permanent magnet in accordance with another embodiment of the present invention.
Figure 6:
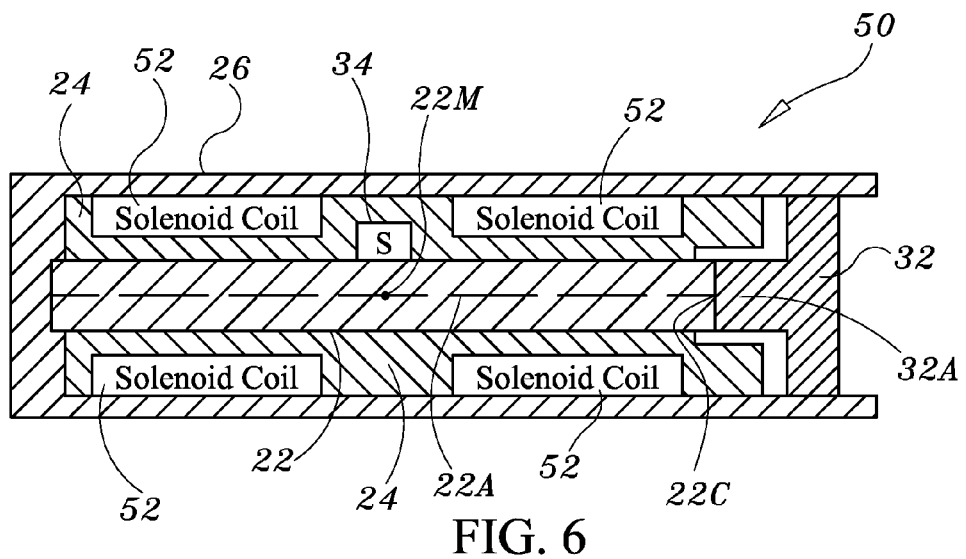
FIG. 6 is a cross-sectional view of a force sensor using electromagnets in accordance with another of the embodiment of the present invention.

As mentioned above, the principles of the present invention could be practiced in a variety of embodiments. For example, FIG. 5 illustrates another embodiment of the present invention where force sensor 40 uses essentially the same components just described, but only uses a single permanent magnet 30 to produce the magnetizing force for rod 22. FIG. 6 depicts another embodiment of the present invention where a force sensor 50 utilizes an electromagnet(s) to produce the magnetizing force. More specifically, one or more solenoid coils 52 are wrapped about guide 24 along rod 22. For example, two solenoid coils 52 could be used to facilitate the placement of sensor 34. Electrical connections to coils 52 as well as their drive source are omitted for clarity of illustration. In this example, piston 32 will typically include a plunger portion 32A slidingly fitted in guide 24 and abutting (or coupled to) longitudinal end 22C of rod 22. The operating principles of these additional embodiments are the same as previously described.

The advantages of the present invention are numerous. The force sensor converts a mechanical force to a change in magnetic angle or magnetic density. The sensor's closed-loop magnetic path incorporating a magnetostrictive material is readily adapted for both cryogenic and non-cryogenic environments and applications.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A force sensor, comprising:
   a rod made from a magnetostrictive material, said rod having a longitudinal axis;
   a substantially non-magnetic housing encasing said rod and supporting sliding movement of said rod therein in a direction aligned with said longitudinal axis thereof;

a magnetic field generator supporting said housing and said rod, said magnetic field generator inducing a magnetic field in and surrounding said rod wherein lines of magnetic flux pass through said rod and are substantially aligned with said longitudinal axis thereof; and a sensor positioned adjacent to said rod and in said magnetic field for measuring changes in at least one of flux angle and flux density when said rod experiences an applied force that is aligned with said longitudinal axis thereof such that said rod slides within said housing.

2. A force sensor as in claim 1, wherein said magnetic field generator includes at least one permanent magnet.

3. A force sensor as in claim 1, wherein said magnetic field generator includes at least one electromagnet.

4. A force sensor as in claim 1, wherein a combination of said rod and said magnetic field generator comprise a closed-loop magnetic path.

5. A force sensor as in claim 1, wherein said magnetostrictive material is selected from the group consisting of terbium-based compounds, gallium-iron compounds, and rare earth zinc crystal-based compounds.

6. A force sensor as in claim 1, wherein said sensor is approximately aligned with a center of mass of said rod.

7. A force sensor, comprising:

a rod made from a magnetostrictive material, said rod having a longitudinal axis;

a magnetic field generator supporting said rod and inducing a magnetic field in and surrounding said rod wherein lines of magnetic flux pass through said rod and are substantially aligned with said longitudinal axis thereof, said magnetic field generator including a movable piston made from a magnetic material, said piston coupled to a first of opposing longitudinal ends of said rod for movement in a direction aligned with said longitudinal axis of said rod; and a sensor positioned adjacent to a surface of said rod for measuring changes in one of flux angle and flux density when said piston experiences said movement wherein a force is applied to said rod that is aligned with said longitudinal axis thereof.

8. A force sensor as in claim 7, wherein said magnetic field generator includes a permanent magnet positioned between said piston and said first of said opposing longitudinal ends of said rod.

9. A force sensor as in claim 8, wherein said magnetic field generator further includes a second permanent magnet positioned adjacent to a second of said opposing longitudinal ends of said rod.

10. A force sensor as in claim 7, wherein said magnetic field generator includes at least one electromagnet disposed about said radial surface of said rod.

11. A force sensor as in claim 7, wherein a combination of said rod and said magnetic field generator comprise a closed-loop magnetic path.

12. A force sensor as in claim 7, wherein said magnetostrictive material is selected from the group consisting of terbium-based compounds, gallium-iron compounds, and rare earth zinc crystal-based compounds.

13. A force sensor as in claim 7, wherein said sensor is approximately aligned with a center of mass of said rod.

* * * * *